United States Patent
Qi et al.

(10) Patent No.: US 8,699,594 B2
(45) Date of Patent: Apr. 15, 2014

(54) OPTIMUM INTERLEAVER DESIGN FOR A COMMUNICATION SYSTEM

(75) Inventors: Yihong Qi, Santa Clara, CA (US); Sudhir Srinivasa, Sunnyvale, CA (US); Hongyuan Zhang, Fremont, CA (US)

(73) Assignee: Marvell World Trade Ltd., St. Michael (BB)

(*) Notice: Subject to any disclaimer, the term of this patent is extended or adjusted under 35 U.S.C. 154(b) by 301 days.

(21) Appl. No.: 13/212,440

(22) Filed: Aug. 18, 2011

(65) Prior Publication Data
US 2012/0051447 A1 Mar. 1, 2012

Related U.S. Application Data

(60) Provisional application No. 61/379,319, filed on Sep. 1, 2010.

(51) Int. Cl.
*H04K 1/10* (2006.01)

(52) U.S. Cl.
USPC .......................................................... 375/260

(58) Field of Classification Search
USPC .......... 370/338, 464, 474, 476; 375/130, 259, 375/260, 267, 295, 299, 308, 340; 714/776
See application file for complete search history.

(56) References Cited

U.S. PATENT DOCUMENTS

| | | | | |
|---|---|---|---|---|
| 2005/0265469 | A1* | 12/2005 | Aldana et al. | 375/260 |
| 2006/0036924 | A1* | 2/2006 | Ghosh | 714/755 |
| 2006/0104377 | A1* | 5/2006 | Chimitt et al. | 375/261 |
| 2006/0274687 | A1* | 12/2006 | Kim | 370/328 |
| 2007/0140364 | A1 | 6/2007 | Ouyang et al. | |
| 2009/0196163 | A1 | 8/2009 | Du | |
| 2010/0046656 | A1 | 2/2010 | van Nee et al. | |
| 2010/0098178 | A1* | 4/2010 | Yang et al. | 375/260 |

FOREIGN PATENT DOCUMENTS

| WO | WO-2006/007571 A1 | 1/2006 |
|---|---|---|
| WO | WO-2012/122119 A1 | 9/2012 |

OTHER PUBLICATIONS

International Preliminary Report on Patentability in corresponding PCT/US2011/048197, dated Mar. 5, 2013.
Hiertz, et al., "The IEEE 802.11 Universe," IEEE Communications Magazine, pp. 62-70, Jan. 2010.
S. A. Mujtaba, "IEEE P802.11—Wireless LANs, TGn Sync Proposal Technical Specification," The Institute of Electrical and Electronics Engineers, Inc., doc.: IEEE 802.11—04/0889r6, May 2005.
Stacey et al., "IEEE P802.11, Wireless LANs, Proposed TGac Draft Amendment," Institute of Electrical and Electronics Engineers, doc. No. IEEE 802.11-10/1361r3 (Jan. 2011).

(Continued)

*Primary Examiner* — Sam K Ahn
*Assistant Examiner* — Shawkat M Ali

(57) ABSTRACT

In a method for interleaving information bits in a physical layer (PHY) data unit, a channel bandwidth to be used for transmitting the PHY data unit is determined and a frequency rotation parameter $N_{ROT}$ corresponding to the channel bandwidth is selected. A spatial stream constant is selected for each spatial stream from the set [0, 5, 2, 7, 3, 6, 1, 4] or a subset thereof depending on a number of spatial streams to be utilized, wherein each constant in the set corresponds to a respective spatial stream. Information bits are interleaved according to the selected frequency rotation parameter $N_{ROT}$ and the selected spatial stream constant.

8 Claims, 13 Drawing Sheets

(56) References Cited

OTHER PUBLICATIONS

Stacey et al., "Specification Framework for TGac," document No. IEEE 802.11-09/0992r20, Institute for Electrical and Electronics Engineers, pp. 1-49, Jan. 18, 2011.
Perahia, et al., "Gigabit Wireless LANs: an overview of IEEE 802.11ac and 80211ad," ACM SIGMOBILE Mobile Computing and Communications Review, vo. 15, No. 3, pp. 23-33, Jul. 2011.
Cariou et al., "Multi-channel Transmissions," Doc. No. IEEE 802.11-09/1022r0, The Institute of Electrical and Electronics Engineers, Inc., Sep. 2009.
Yuan et al., "Carrier Aggregation for LTE-Advanced Mobile Communication Systems," IEEE Communications Magazine, pp. 88-93, Feb. 2010.
Noh, et al., "Channel Selection and Management for 11ac," Doc. No. IEEE 802.11-10/0593r1, The Institute of Electrical and Electronics Engineers, Inc., May 20, 2010.
Redieteab, et al., "Cross-Layer Multichannel Aggregation for Future WLAN Systems," 2010 IEEE Int'l Conf.. on Communication Systems (ICCS), pp. 740-745, Nov. 2010.
Park, "IEEE 802.11ac: Dynamic Bandwidth Channel Access," 2011 IEEE Int'l Conf. on Communications (ICC), pp. 1-5, Jun. 2011.
Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).
IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).
IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," *The Institute of Electrical and Electronics Engineers, Inc.*, Nov. 7, 2001.
IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.* Apr. 2003.
"IEEE P802.11n™/D3.00, Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.
"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.
International Search Report in corresponding PCT/US2011/048197 dated Jan. 23, 2012.
Written Opinion in corresponding PCT/US2011/048197 dated Jan. 23, 2012.
International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).
IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, 1999.
IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band,"*The Institute of Electrical and Electronics Engineers, Inc.*, May 2002.
IEEE Std P802.11-REVma/06.0, "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications. (This document reflects the combining of the 2003 Edition of 802.11 plus the 802.11 g, 802.11 h, 802.11 i and 802.11j Amendments) (Revision of IEEE Std 802.11-1999) (Superseded by P802.11-REVma_D7.0)," 2006.
IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).
Chen, "Home Network Basis: Transmission Environments and Wired/Wireless Protocols," Prentice Hall (Jul. 2003).
van Nee, et al. "The 802.11n MIMO-OFDM Standard for Wireless LAN and Beyond," Wireless Personal Communications, vol. 37, pp. 445-453 (Jun. 2006).

\* cited by examiner

OPTIMUM INTERLEAVER DESIGN FOR A COMMUNICATION SYSTEM

CROSS-REFERENCE TO RELATED APPLICATIONS

This disclosure claims the benefit of U.S. Provisional Patent Application No. 61/379,319, filed on Sep. 1, 2010, which is hereby incorporated by reference herein in its entirety.

FIELD OF THE DISCLOSURE

The present disclosure relates generally to communication networks and, more particularly, to interleaving data to be transmitted in a wireless network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Development of wireless local area network (WLAN) standards such as the Institute for Electrical and Electronics Engineers (IEEE) 802.11a, 802.11b, 802.11g, and 802.11n Standards, has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput.

SUMMARY

In one embodiment, a method for interleaving information bits in a physical layer (PHY) data unit includes determining a channel bandwidth to be used for transmitting the PHY data unit and selecting a frequency rotation parameter $N_{ROT}$ corresponding to the channel bandwidth. The method also includes, for each spatial stream, (i) selecting a spatial stream constant from the set [0, 5, 2, 7, 3, 6, 1, 4] or a subset thereof depending on a number of spatial streams to be utilized, wherein each constant in the set corresponds to a respective spatial stream, and (ii) interleaving information bits according to the selected frequency rotation parameter $N_{ROT}$ and the selected spatial stream constant.

In another embodiment, an apparatus comprises a network interface device configured to determine a channel bandwidth to be used for transmitting a PHY data unit. The network interface device comprises an interleaver configured to select a frequency rotation interleaving parameter $N_{ROT}$ corresponding to the channel bandwidth. The interleaver is further configured to, for each spatial stream, (i) select a spatial stream constant from the set [0, 5, 2, 7, 3, 6, 1, 4] or a subset thereof depending on a number of spatial streams to be utilized, wherein each constant in the subset corresponds to a corresponding spatial stream, and (ii) interleave the information bits according to the selected frequency rotation parameter $N_{ROT}$ and the selected spatial stream constant.

In yet another embodiment, a method for determining interleaver parameters for a multiple input multiple output (MIMO) communication system includes determining maximum average distance for a plurality of adjacent spatial streams for a plurality of system configurations. The method also includes determining an interleaver parameter set for the plurality of system configurations based on the determined maximum average distance.

In still another embodiment, a computer readable medium having stored thereon machine executable instructions. The machine executable instructions are capable of causing the machine to determine interleaver parameters for a multiple input multiple output (MIMO) communication system by determining maximum average distance for a plurality of adjacent spatial streams for a plurality of system configurations, and determining an interleaver parameter set for the plurality of system configurations based on the determined maximum average distance.

DETAILED DESCRIPTION

Figure 1:
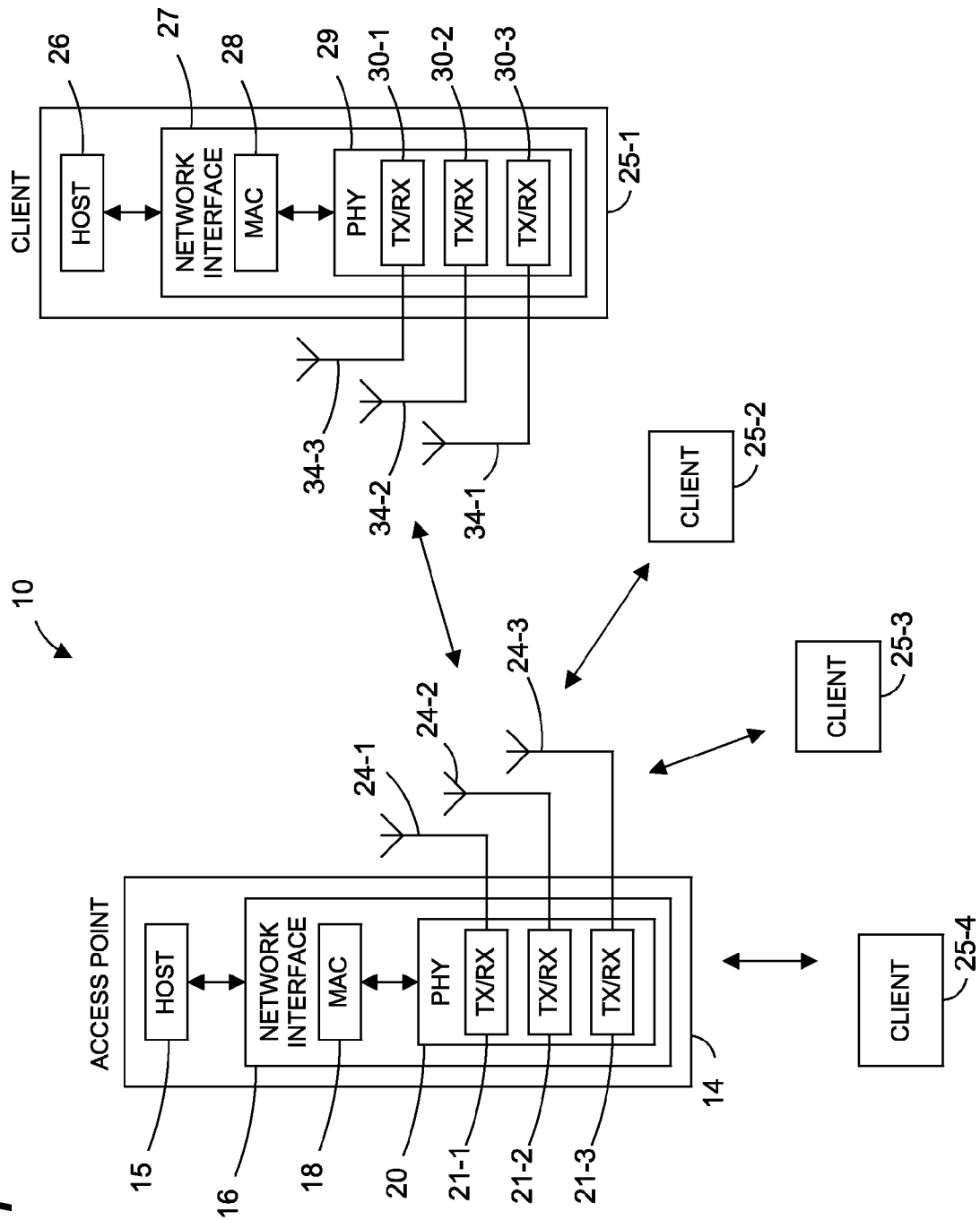
FIG. 1 is a block diagram of an example embodiment of a wireless local area network (WLAN) that utilizes information bit interleaving techniques described herein, according to an embodiment.

FIG. 1 is a block diagram of an example embodiment of a wireless local area network (WLAN) 10 that utilizes information bit interleaving techniques described herein, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments. In one embodiment, the MAC processing unit 18 and the PHY processing unit 20 are configured to operate according to a first communication protocol (e.g., the IEEE 802.11ac Standard, now in the process of being standardized). The first communication protocol is also referred to herein as a very high throughput (VHT) protocol. In another embodiment, the MAC processing unit 18 and the PHY processing unit 20 are also configured to operate according to at least a second communication protocol (e.g., the IEEE 802.11n Standard, the IEEE 802.11a Standard, etc.).

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the first communication protocol.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In an embodiment, one or all of the client stations 25-2, 25-3 and 25-4, have a structure the same as or similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the first communication protocol. The transceiver(s) 21 is/are configured to transmit the generated data units via the antenna(s) 24. Similarly, the transceiver(s) 24 is/are configured to receive the data units via the antenna(s) 24. The PHY processing unit 20 of the AP 14 is configured to process received data units conforming to the first communication protocol, according to an embodiment.

In various embodiments, the PHY processing unit 29 of the client device 25-1 is configured to generate data units conforming to the first communication protocol. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol, according to an embodiment.

Figure 2:
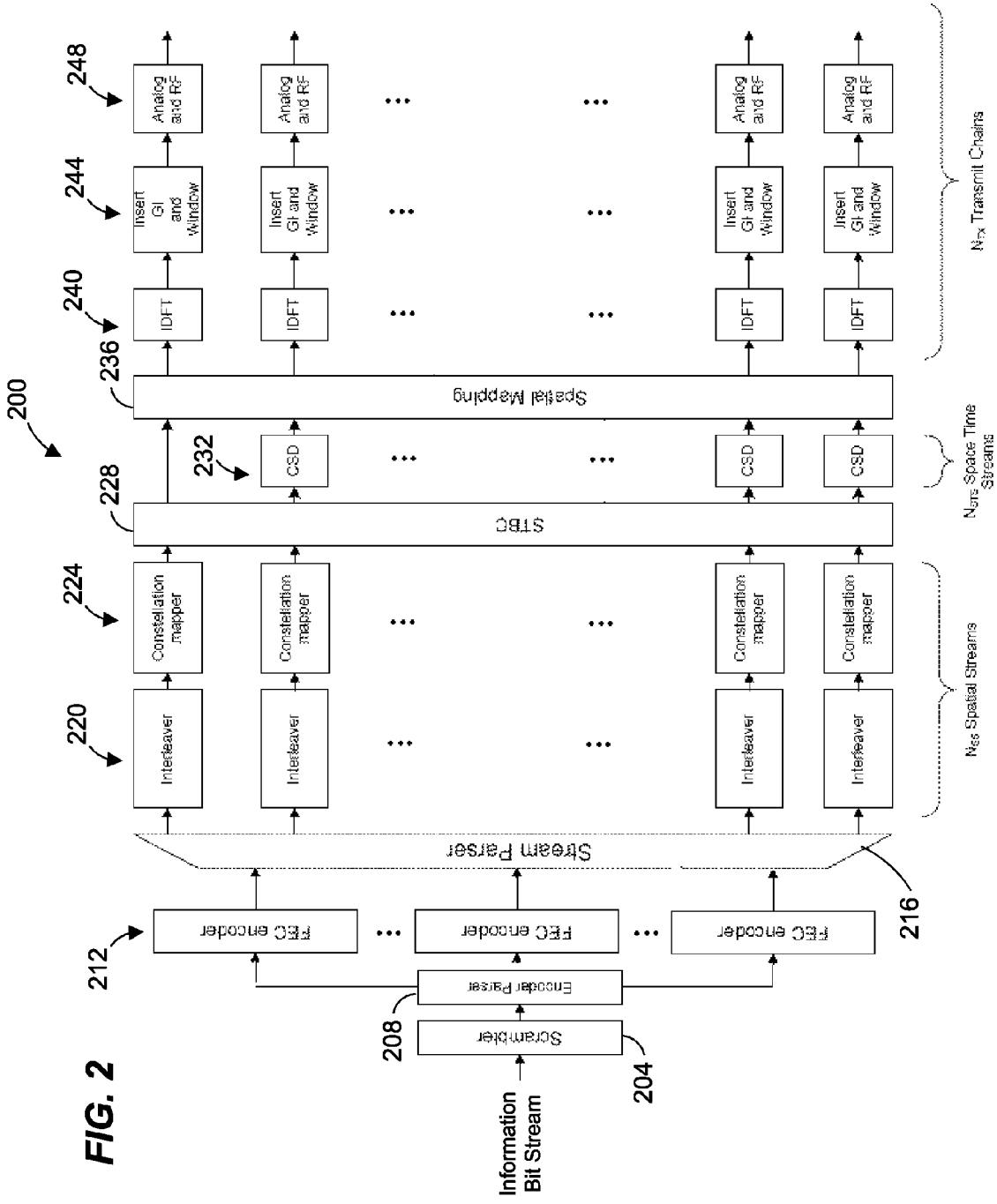
FIG. 2 is a block diagram of an example physical layer (PHY) processing unit, according to an embodiment.

FIG. 2 is a block diagram of an example PHY processing unit 200 configured to operate according to the VHT protocol, according to an embodiment. Referring to FIG. 1, the AP 14 and the client station 25-1, in one embodiment, each include a PHY processing unit such as the PHY processing unit 200.

The PHY unit 200 includes a scrambler 204 that generally scrambles an information bit stream to reduce the occurrence of long sequences of ones or zeros, according to an embodiment. In another embodiment, the scrambler 204 is replaced with a plurality of parallel scramblers located after an encoder parser 208. In this embodiment, each of the parallel scramblers has a respective output coupled to a respective one of a plurality of FEC encoders 212. The plurality of parallel scramblers operate simultaneously on a demultiplexed stream. In yet another embodiment, the scrambler 204 comprises a plurality of parallel scramblers and a demultiplexer that demultiplexes the information bit stream to the plurality of parallel scramblers, which operate simultaneously on demultiplexed streams. These embodiments may be useful, in some scenarios, to accommodate wider bandwidths and thus higher operating clock frequencies.

The encoder parser 208 is coupled to the scrambler 204. The encoder parser 208 demultiplexes the information bit stream into one or more encoder input streams corresponding to one or more FEC encoders 212. In another embodiment with a plurality of parallel scramblers, the encoder parser 208 demultiplexes the information bit stream into a plurality of streams corresponding to the plurality of parallel scramblers.

Each encoder 212 encodes the corresponding input stream to generate a corresponding encoded stream. In one embodiment, each FEC encoder 212 includes a binary convolutional encoder. In another embodiment, each FEC 212 encoder includes a binary convolutional encoder followed by a puncturing block. In another embodiment, each FEC encoder 212 includes a low density parity check (LDPC) encoder. In yet another embodiment, each FEC encoder 212 additionally includes a binary convolutional encoder followed by a puncturing block. In this embodiment, each FEC encoder 212 is configured to implement any of: 1) binary convolutional encoding without puncturing; 2) binary convolutional encoding with puncturing; or 3) LDPC encoding.

A stream parser 216 parses the one or more encoded streams into one or more spatial streams for separate interleaving and mapping into constellation points. Corresponding to each spatial stream, an interleaver 220 interleaves bits of the spatial stream (i.e., changes the order of the bits) to prevent long sequences of adjacent noisy bits from entering a decoder at the receiver. Also corresponding to each spatial stream, a constellation mapper 224 maps an interleaved sequence of bits to constellation points corresponding to different subcarriers of an orthogonal frequency division multiplexing (OFDM) symbol. More specifically, for each spatial stream, the constellation mapper 224 translates every bit sequence of length log 2(M) into one of M constellation points. The constellation mapper 224 handles different numbers of constellation points depending on the modulation and coding scheme (MCS) being utilized. In an embodiment, the constellation mapper 224 is a quadrature amplitude modulation (QAM) mapper that handles M=2, 4, 16, 64, 256, and 1024. In other embodiments, the constellation mapper 224 handles different modulation schemes corresponding to M equaling different subsets of at least two values from the set {2, 4, 16, 64, 256, 1024}.

In an embodiment, a space-time block coding unit 228 receives the constellation points corresponding to the one or more spatial streams and spreads the spatial streams to a greater number of space-time streams. In some embodiments, the space-time block coding unit 228 is omitted. A plurality of CSD units 232 are coupled to the space-time block unit 228. The CSD units 232 insert cyclic shifts into all but one of the space-time streams (if more than one space-time stream) to prevent unintentional beamforming. For ease of explanation, the inputs to the CSD units 232 are referred to as space-time streams even in embodiments in which the space-time block coding unit 228 is omitted.

A spatial mapping unit 236 maps the space-time streams to transmit chains. In various embodiments, spatial mapping includes one or more of: 1) direct mapping, in which constellation points from each space-time stream are mapped directly onto transmit chains (i.e., one-to-one mapping); 2) spatial expansion, in which vectors of constellation point from all space-time streams are expanded via matrix multiplication to produce inputs to the transmit chains; and 3) beamforming, in which each vector of constellation points from all of the space-time streams is multiplied by a matrix of steering vectors to produce inputs to the transmit chains.

Each output of the spatial mapping unit 236 corresponds to a transmit chain, and each output of the spatial mapping unit 236 is operated on by an IDFT unit 240 that converts a block of constellation points to a time-domain signal. Outputs of the IDFT units 240 are provided to GI insertion and windowing units 244 that prepend, to each OFDM symbol, a guard interval (GI) portion, which is a circular extension of the OFDM symbol in an embodiment, and smooth the edges of each symbol to increase spectral decay. Outputs of the GI insertion and windowing units 244 are provided to analog and RF units 248 that convert the signals to analog signals and upconvert the signals to RF frequencies for transmission. The signals are transmitted in a 20 MHz, a 40 MHz, an 80 MHz, a 120 MHz, or a 160 MHz bandwidth channel, in various embodiments and/or scenarios.

According to an embodiment, each interleaver 220 changes the order of coded bits in order to avoid situations in which consecutive coded bits are affected by the same channel conditions. More specifically, an interleaver 220 maps adjacent coded bits onto non-adjacent locations in the frequency domain or in the time domain. In some embodiments, interleaving is performed via a plurality of consecutive bit permutations, and in these embodiments, interleaver design involves selection of several interleaver parameters, which generally depend on the particular system configurations for which the interleaver design is being utilized. In a MIMO OFDM system, such as the WLAN 10 of FIG. 1, interleaver parameter selection depends, for example, on the number of data subcarriers in an OFDM symbol and the number of spatial streams being utilized in the particular communication channel.

According to an embodiment utilizing OFDM modulation, a first permutation ensures that adjacent coded bits are mapped onto non-adjacent sub-carriers. This operation, in an embodiment, is represented by:

$$w_k^{i_{ss}} = x_i^{i_{ss}}$$

$$i = 9 \cdot N_{BPSCS} \cdot (k \bmod 26) + \text{floor}(k/26), k = 0, 1, \ldots,$$
$$N_{CBPSS}(i_{SS}) - 1 \quad \text{Equation 1}$$

where k and i represent output and input bit indices, respectively, $i_{ss}$ is a spatial stream index, and $N_{CBPSS}(i_{ss})$ is a number of coded bits per symbol for the i-th spatial stream. A second permutation, performed on the output of the first permutation, according to an embodiment, ensures that adjacent bits are mapped alternatively onto less significant and more significant bits of a constellation thereby avoiding long sequences of consecutively coded low reliability bits. In an embodiment, the second permutation is represented by:

$$y_j^{i_{ss}} = w_k^{i_{ss}} \quad \text{Equation 2}$$

$$j = s \cdot \text{floor}(k/s) + \left(k + N_{CBPSS} - \text{floor}\left(\frac{26 \cdot k}{N_{CBPSS}}\right)\right) \bmod s$$

$$s = \max\left\{1, \frac{N_{CBPSS}}{2}\right\}, i = 0, 1, \ldots, N_{CBPSS} - 1$$

where k is a subcarrier index at an output of the first permutation for the spatial stream $i_{ss}$, j is a subcarrier index at an output of the second permutation for the spatial stream $i_{ss}$, and $N_{CBPSS}$ is a number of coded bits for the spatial stream for which the permutation is being performed.

Further, in some embodiments, a third permutation is performed on the output of the second permutation, wherein the third permutation introduces a different frequency rotation for each spatial stream. According to an embodiment, the offset frequency rotation is characterized by $N_{ROT} \times N_{BPSCS} \times n_{i_{ss}}$, where $N_{ROT}$ is a frequency rotation parameter, $N_{BPSCS}$ is the number of bits per subcarrier, and $n_{ss}$ a spatial stream constant, which is generally specified for each spatial stream $i_{ss}$. For example, with reference to FIG. 2, in an embodiment or scenario in which the parser 216 parses the information bits into eight spatial streams, the constant $n_{i_{ss}}$ is selected from a set $[n_0, n_1, \ldots, n_7]$, where $n_0$-$n_7$ are integers corresponding to the spatial streams $i_{ss}$=0 through $i_{ss}$=7, respectively.

Generally, there is a large number of possible values for the frequency rotation parameter $N_{ROT}$ as well as a large number of possible spatial stream constant sets that can be used in a particular communication system, and optimal values for these interleaver parameters vary for different system configurations (i.e., depending on the particular MCS being utilized, the channel bandwidth, the number of data tones in an OFDM symbol, the number of spatial streams, etc.). In some embodiments, however, one or a few values for $N_{ROT}$ as well as one or a few spatial stream constant sets are defined for a plurality of different system configurations. In these embodiments, $N_{ROT}$ and $n_{iss}$ values are selected such that channel performance at the plurality of system configurations meet a certain criteria. For example, in one such embodiment, packet error rate (PER) is used as the selection criteria. That is, in this embodiment, $N_{ROT}$ and $n_{iss}$ are selected such that a suitably low PER is achieved in a plurality of system configurations. In some embodiments, $N_{ROT}$ and $n_{iss}$ parameter sets are selected using a systematic interleaver design approach in which the selection is based on the largest average distance between adjacent spatial streams in frequency domain or in time domain. This systematic approach to interleaver design, described in more detail below, results in an interleaver parameter selection process that is lower in computational complexity and is generally more effective than an extensive search among the large number of possible interleaver parameters.

In one such embodiment, the spatial stream constant set corresponding to eight spatial streams is the set [0, 5, 2, 7, 3, 6, 1, 4], or a subset thereof, regardless of the particular system configuration being utilized. In some embodiments, when less than eight spatial streams are used (as determined by the particular MCS being utilized), the spatial stream constant set corresponds to a subset of the set defined for eight spatial streams. For example, in an embodiment utilizing the spatial stream constant set described above (i.e., the set [0, 5, 2, 7, 3, 6, 1, 4]), the spatial stream constant set is the set [0 5 2 7 3 6 1] for the case of seven spatial streams, the set [0 5 2 7 3 6] for the case of six spatial streams, etc. Further, in some embodiments, the particular value of the frequency rotation parameter $N_{ROT}$ only depends on the channel bandwidth. For example, in one embodiment, $N_{ROT}$ equals 6, 13, or 28 for the 20 MHz channel, the 40 MHz channel, or the 80 MHz channel, respectively.

In some embodiments, a separate spatial stream constant set and rotation parameters are defined for cases of more than four spatial streams. For example, in one such embodiment, the spatial stream set and the corresponding subsets for cases of less than eight spatial streams are used as discussed for the case of five spatial stream, six spatial streams, seven spatial streams, or eight spatial streams. In this embodiment, the third interleaver permutation (e.g., the third permutation performed by each interleaver 220, FIG. 2) is represented by:

$$r = \{j - J(i_{ss})N_{ROT}N_{BPSCS}\} \bmod N_{CBPSS}$$

$$j = 0, 1, \ldots, N_{CBPSS} - 1 \quad \text{Equation 3}$$

where $i_{ss}$ is the spatial stream index, $N_{BPSCS}$ is a number of bits per subcarrier, $N_{CBPSS}$ is a number of coded bits for the spatial stream, and $J(i_{ss})$ is a corresponding constant in the spatial stream constant set (e.g., the spatial stream constant set [0, 5, 2, 7, 3, 6, 1, 4] discussed above).

On the other hand, according to an embodiment, for the cases of two spatial streams, three spatial streams, or four spatial streams, the third permutation performed by each interleaver 220 is represented by:

$$r = \left\{ j - \left[ (2(i_{ss} - 1))\bmod 3 + 3 \left\lfloor \frac{i_{ss} - 1}{3} \right\rfloor \right] N_{ROT} N_{BPSCS} \right\}$$ Equation 4

$$\bmod N_{CBPSS}$$

$$j = 0, 1, \ldots, N_{CBPSS} - 1$$

where r and j represent the output and input bit indices, respectively, $i_{ss}$ is the spatial stream index, $N_{BPSCS}$ is the number of bits per subcarrier, and $N_{CBPSS}$ is the number of coded bits for the spatial stream.

Of course, a corresponding deinterleaving operation is performed for the received information bits at the receiving end. The deinterleaving operation is performed by the PHY processing unit 29 at the client station 25-1 (FIG. 1), for example, in one embodiment. In an embodiment, the deinterleaving operation for the cases of more than four spatial streams is represented by:

$$j = \{r + J(i_{ss}) N_{ROT} N_{BPSCS}\} \bmod N_{CBPSS}$$

$$r = 0, 1, \ldots, N_{CBPSS} - 1$$ Equation 5 where j and r represent the output and input bit indices, respectively, $i_{ss}$ is the spatial stream index, $N_{BPSCS}$ is the number of bits per subcarrier, $N_{CBPSS}$ is the number of coded bits for the spatial stream, and $J(i_{ss})$ is a corresponding constant in the spatial stream constant set (e.g., the spatial stream constant set [0, 5, 2, 7, 3, 6, 1, 4] discussed above).

Similarly, in an embodiment, the deinterleaving operation for the case of two spatial streams, three spatial streams, or four spatial streams is represented by:

$$j = \left\{ r + \left[ (2(i_{ss} - 1))\bmod 3 + 3 \left\lfloor \frac{i_{ss} - 1}{3} \right\rfloor \right] N_{ROT} N_{BPSCS} \right\}$$ Equation 7

$$\bmod N_{CBPSS}$$

$$r = 0, 1, \ldots, N_{CBPSS} - 1$$

where j and r represent the output and input bit indices, respectively, $i_{ss}$ is the spatial stream index, $N_{BPSCS}$ is the number of bits per subcarrier, and $N_{CBPSS}$ is the number of coded bits for the spatial stream.

In some embodiments, the particular values for the frequency rotation parameter $N_{ROT}$ and the particular values of spatial stream constants are selected based on a maximum average distance in the frequency domain or the time domain between two adjacent spatial streams. According to an embodiment, the time domain average distance is measured in terms of symbol duration in time. On the other hand, in an OFDM system, the maximum average distance in the frequency domain corresponds to the maximum average subcarrier distance between adjacent spatial streams, according to an embodiment. In one such embodiment, for example, the average distance between two adjacent spatial streams is determined according to:

$$x_i^{iss} \to z_k^{iss}$$ Equation 8

$$x_i^{iss+1} \to z_m^{iss+1}$$

$$D = \frac{1}{A} \sum_{i_{ss}} \sum_k |k - m|$$

where i is a data tone index before the permutation, k and m are data tone indices for an $i_{ss}$-th spatial stream and an $i_{ss}+1$-th spatial stream, respectively, after the permutation, $i_{ss}$ is the spatial stream index, and A is a normalizing factor.

Alternatively, in another embodiment utilizing OFDM modulation, the maximum average distance is determined among J adjacent spatial streams. That is, in an embodiment, the average distance is determined according to:

$$x_i^{iss} \to z_k^{iss}$$ Equation 9

$$x_i^{iss+j} \to z_m^{iss+j}$$

$$0 < j \le J$$

$$D = \frac{1}{A} \sum_{j=1}^{J} \sum_{i_{ss}} \sum_k |k - m|$$

where i is the data tone index before the permutation, k and m are data tone indices for an $i_{ss}$-th spatial stream and an $i_{ss}+j$-th spatial stream, respectively, after the permutation, $i_{ss}$ is the spatial stream index, and A is a normalizing factor. Equation 9 is useful, for example, in a case in which an equal maximum average distance as determined by Equation 8 corresponds to multiple different frequency rotation parameters $N_{ROT}$ and spatial stream constant set combinations, at least in some scenarios.

Figure 3:
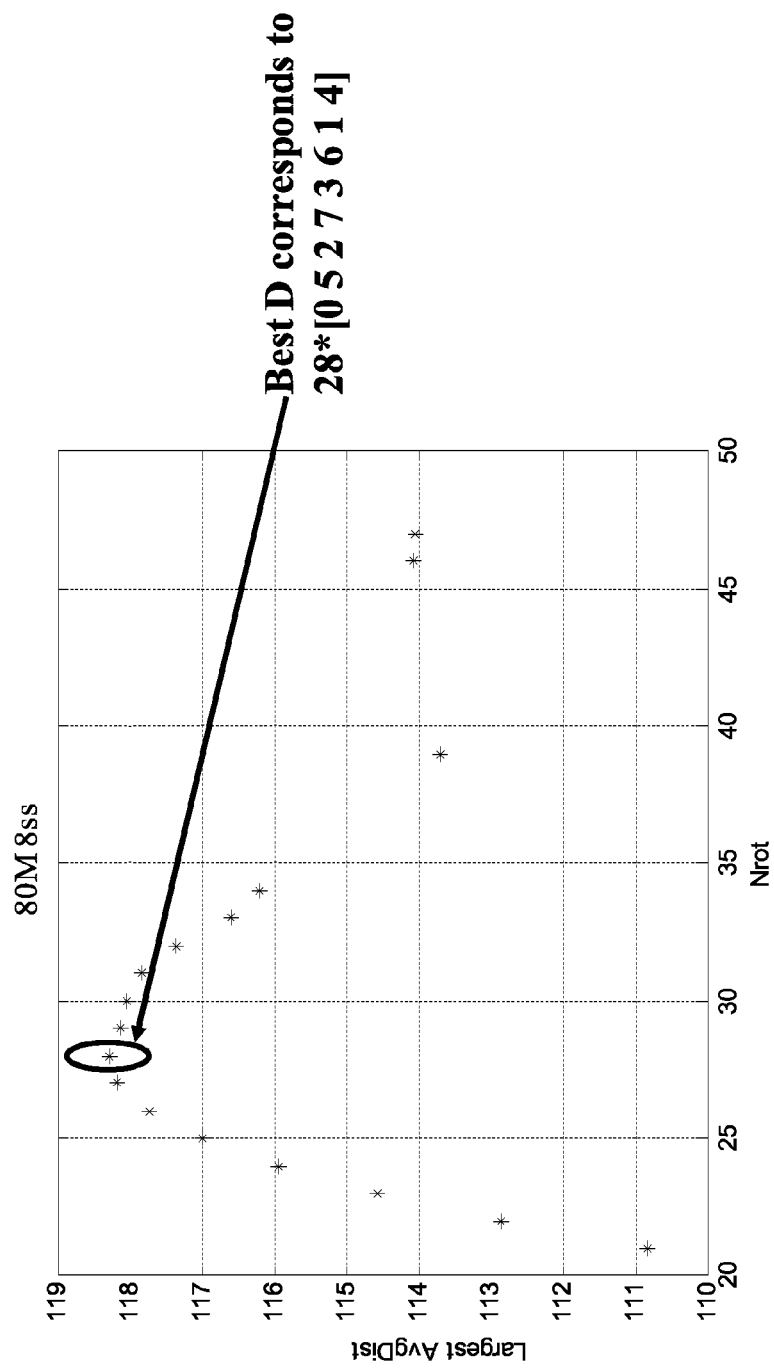
FIG. 3, is a plot of maximum average distance values for an example interleaver design, according to an embodiment.
Figure 4:
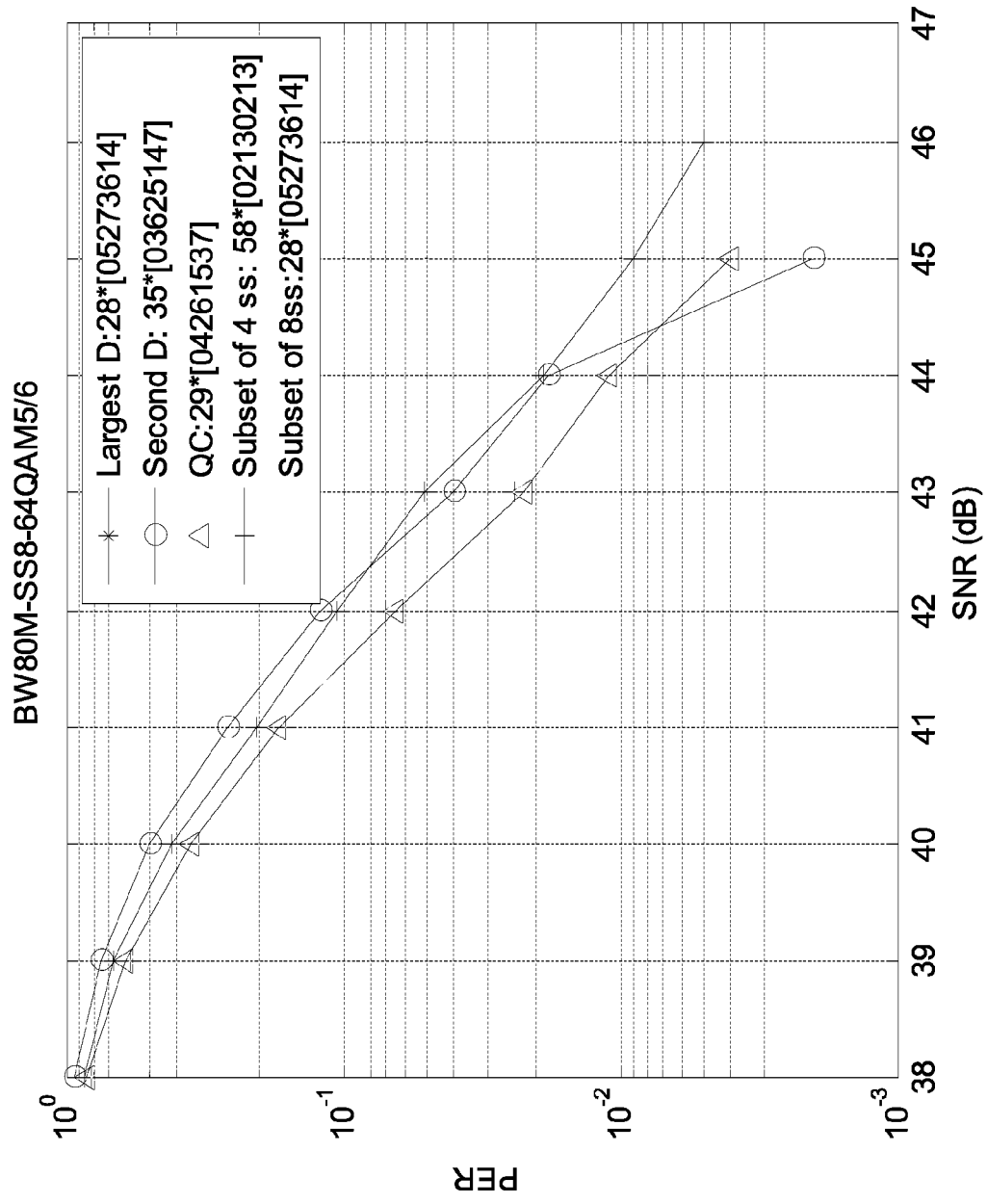
FIGS. 4-11 are simulation results comparing various interleaver parameters in an example interleaver design, according to an embodiment.
Figure 5:
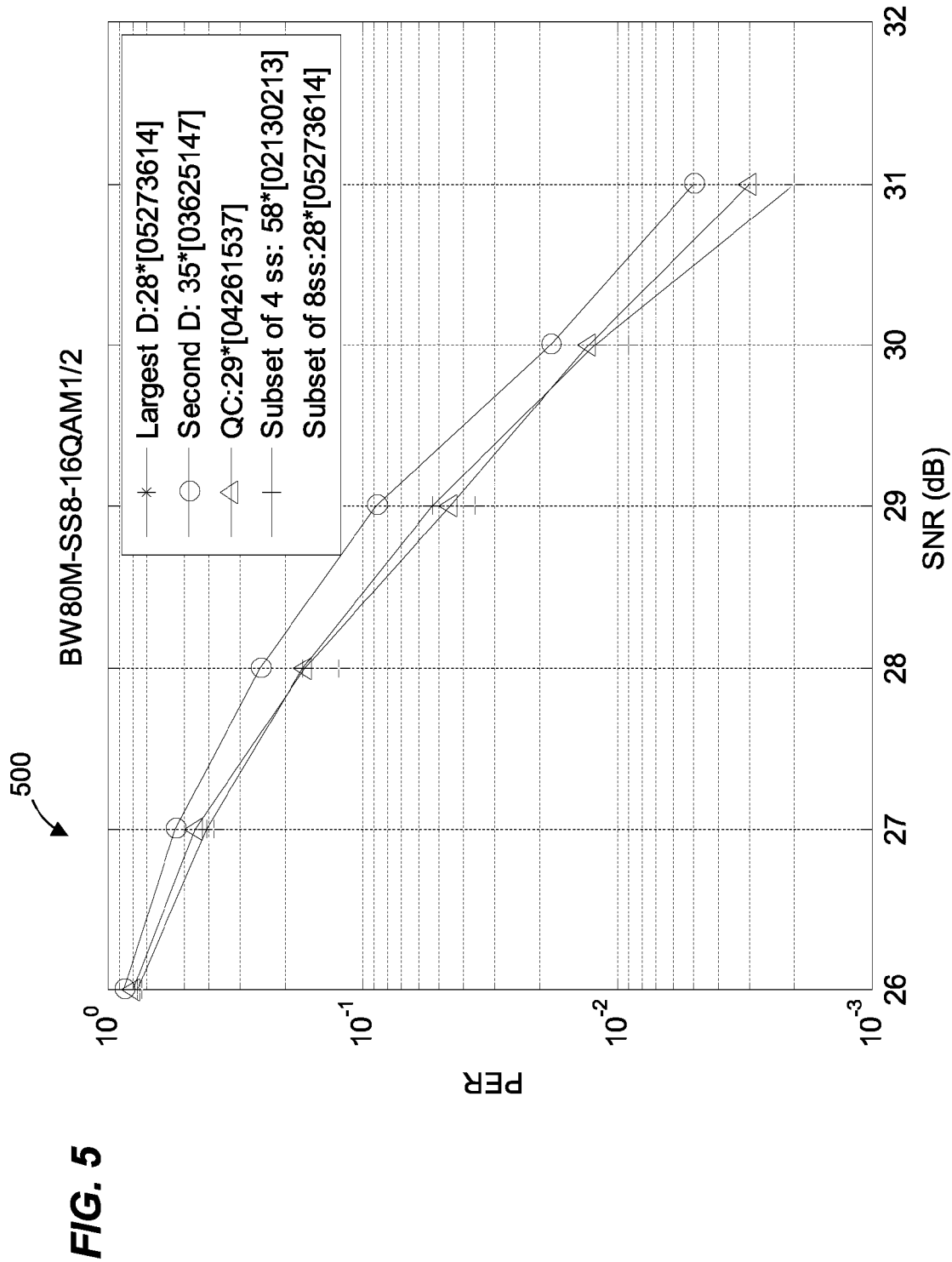
Figure 6:
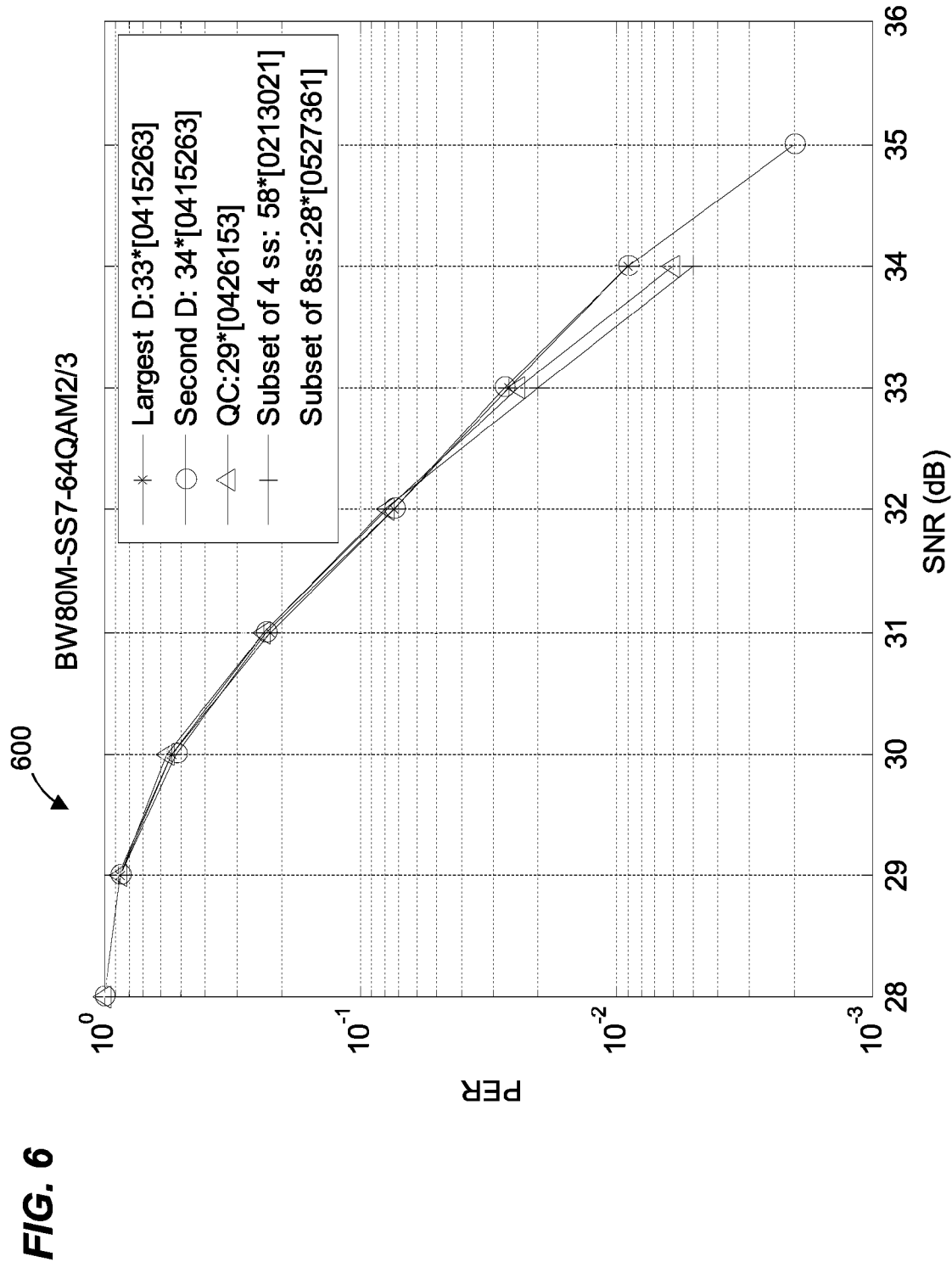
Figure 7:
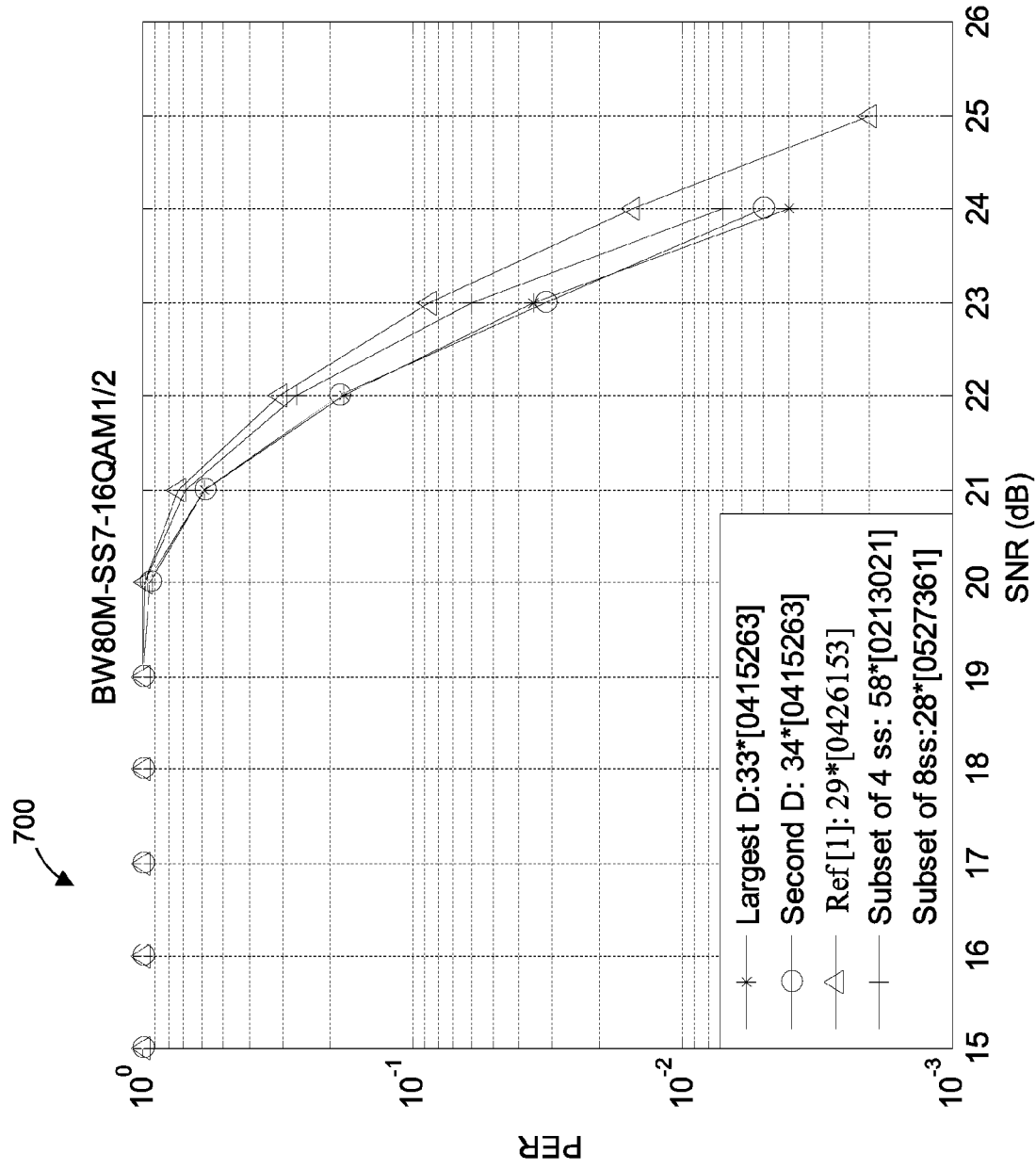
Figure 8:
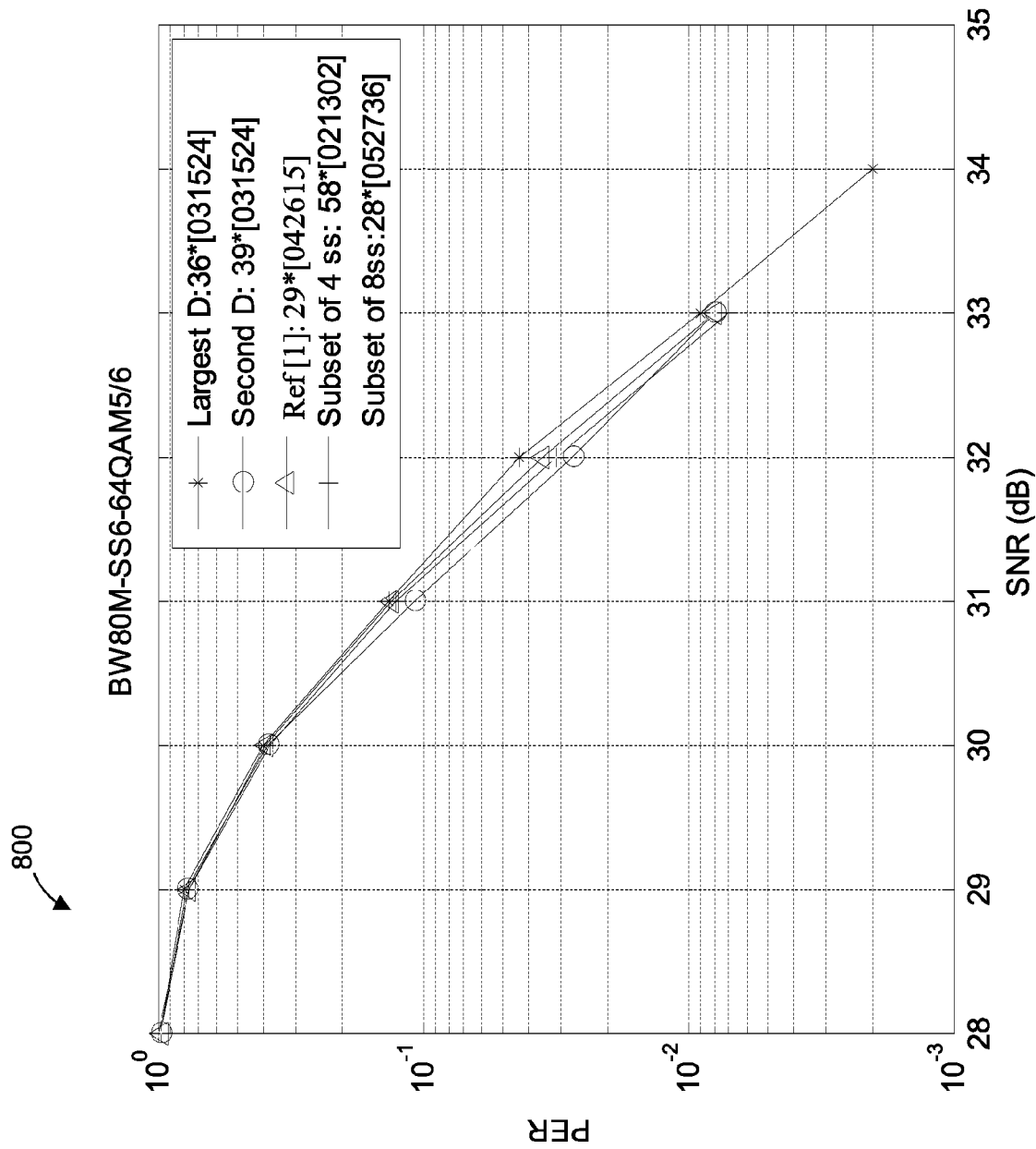
Figure 9:
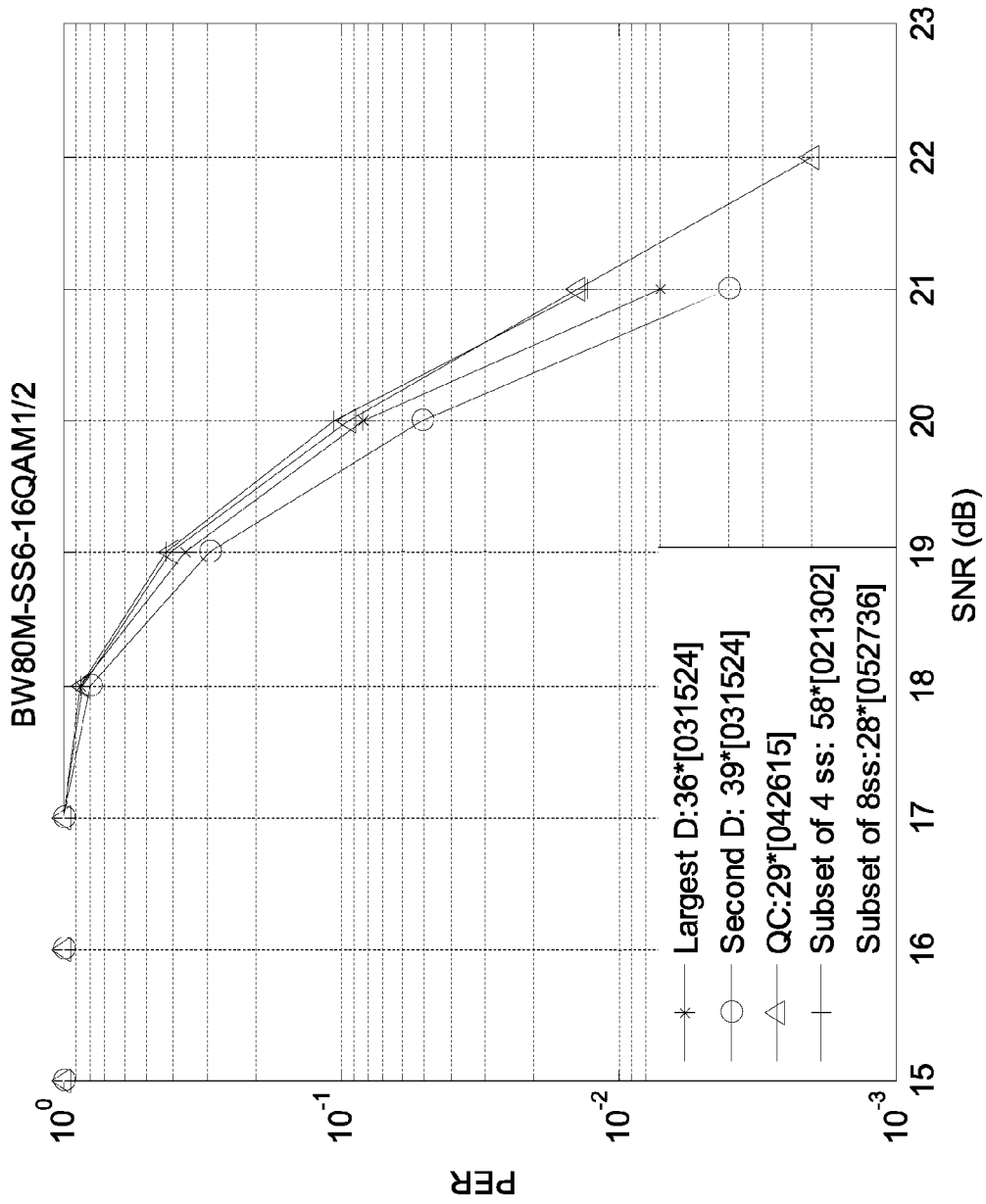
Figure 10:
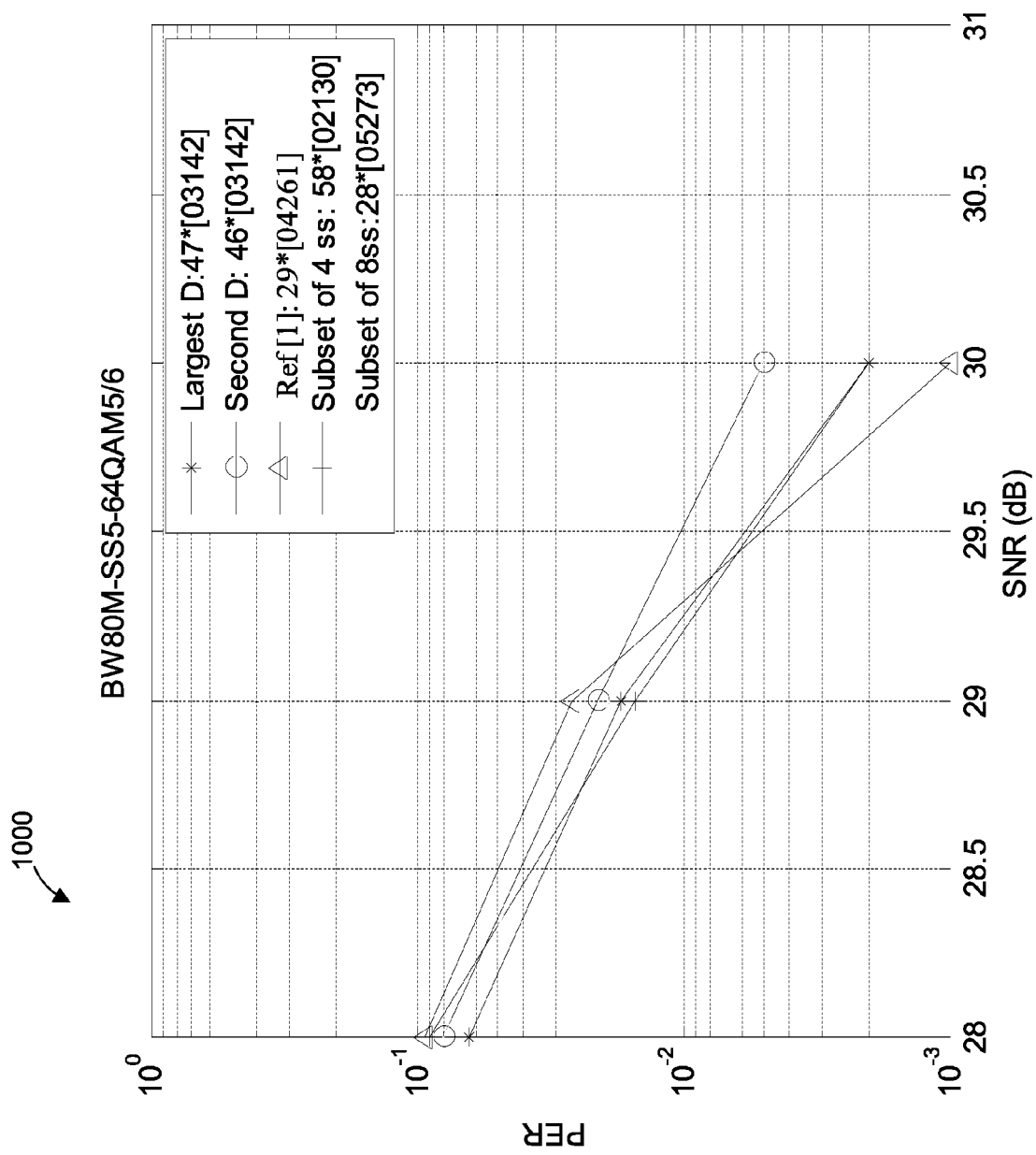
Figure 11:
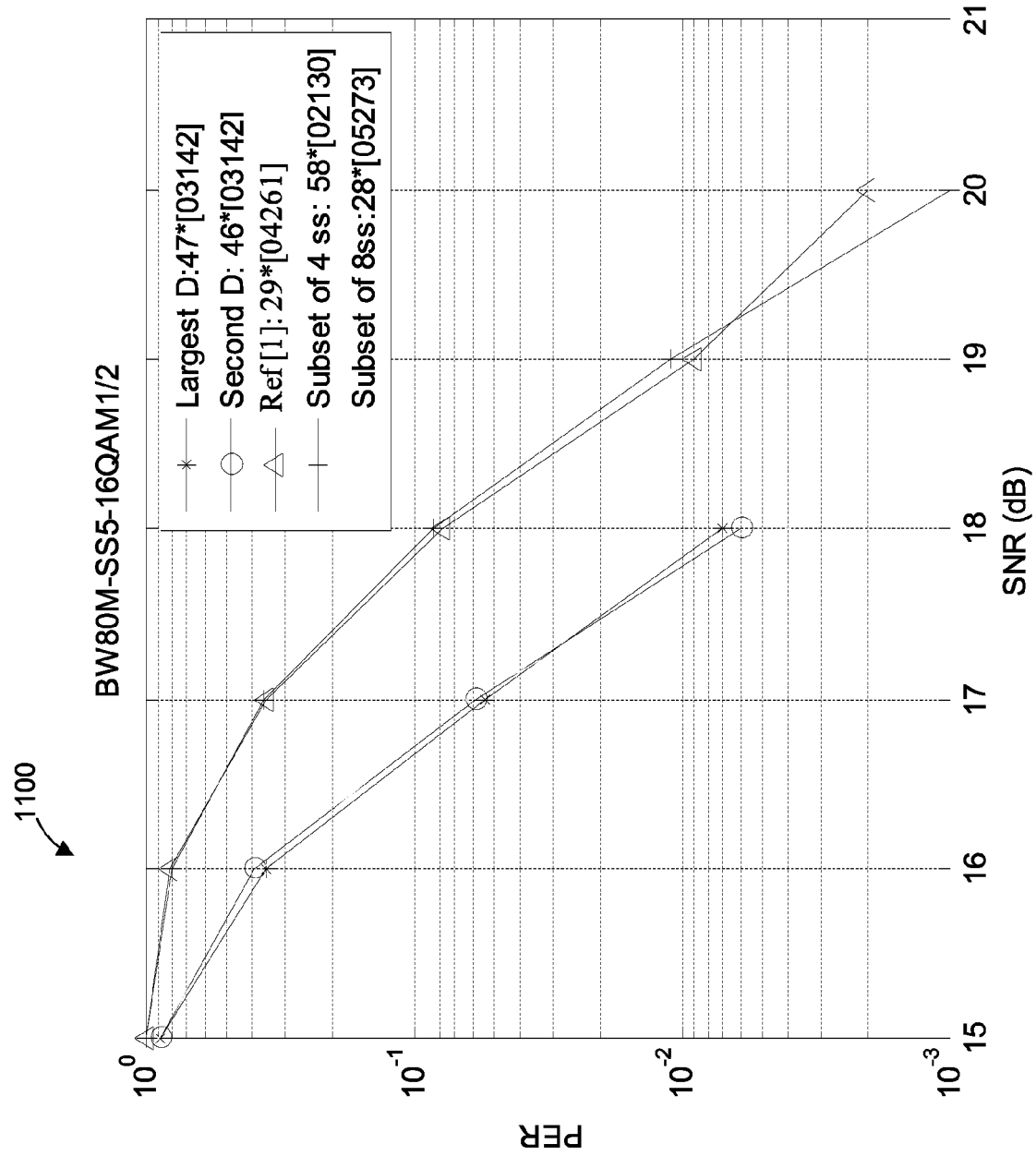

In some embodiments, average distance D is determined according to Equation 8 (or Equation 9) for a plurality of suitable rotation factors $N_{ROT}$ and a plurality of suitable spatial stream constant sets, and a maximum average distance corresponding to a particular $N_{ROT}$ and a particular spatial stream constant set is determined. FIG. 3, for example, is a plot 300 of maximum average distance values for a plurality of frequency rotation parameters $N_{ROT}$ and a plurality of possible spatial stream constant permutations for an interleaver designed for eight spatial streams for an 80 MHz channel. The maximum point on the plot 300 corresponds to the case in which the mapping of two consecutive information bits at the input to the interleaving operation results in the information bits separated from each other, on average, by the maximum subcarrier distance on adjacent spatial streams at the output of the interleaving operation. In an embodiment, this maximum average distance is then used as a reference corresponding to the best or close to best packet error rate (PER) performance in the corresponding system configuration. Such references are determined for a plurality of suitable system configurations (e.g., corresponding to various modulation coding schemes (MCSs), various numbers of data tones, various channel bandwidths, etc.) to determine spatial stream constant sets and frequency rotation $N_{ROT}$ parameters that provide suitable PER performance in a plurality of system configurations.

FIGS. 4-11 illustrate simulation results comparing various rotation parameters in combination with various spatial stream constant sets for different configurations of the WLAN 10 (FIG. 1). The simulations correspond to a packet lengths of 8000 bits in an 80 MHz channel, with 1000 channel realizations generated for each PER curve. The simulations show that that the frequency rotation factor and the spatial stream selection based on the largest average subcarrier distance provides the best or close to the best PER performance in all of the simulated system configurations. In general, because PER depends on system factors such as, for example, the particular MCS being utilized, the number of spatial streams, correlation between antenna elements, etc., in addition to the selected interleaver parameters, none of the five simulated $N_{ROT}$ and spatial stream constant set combinations provides the best PER performance in all of the simulated system configurations. However, as can be seen in FIGS. 4-11 some sets show severe degradation in PER performance in certain system configurations.

Figure 12:
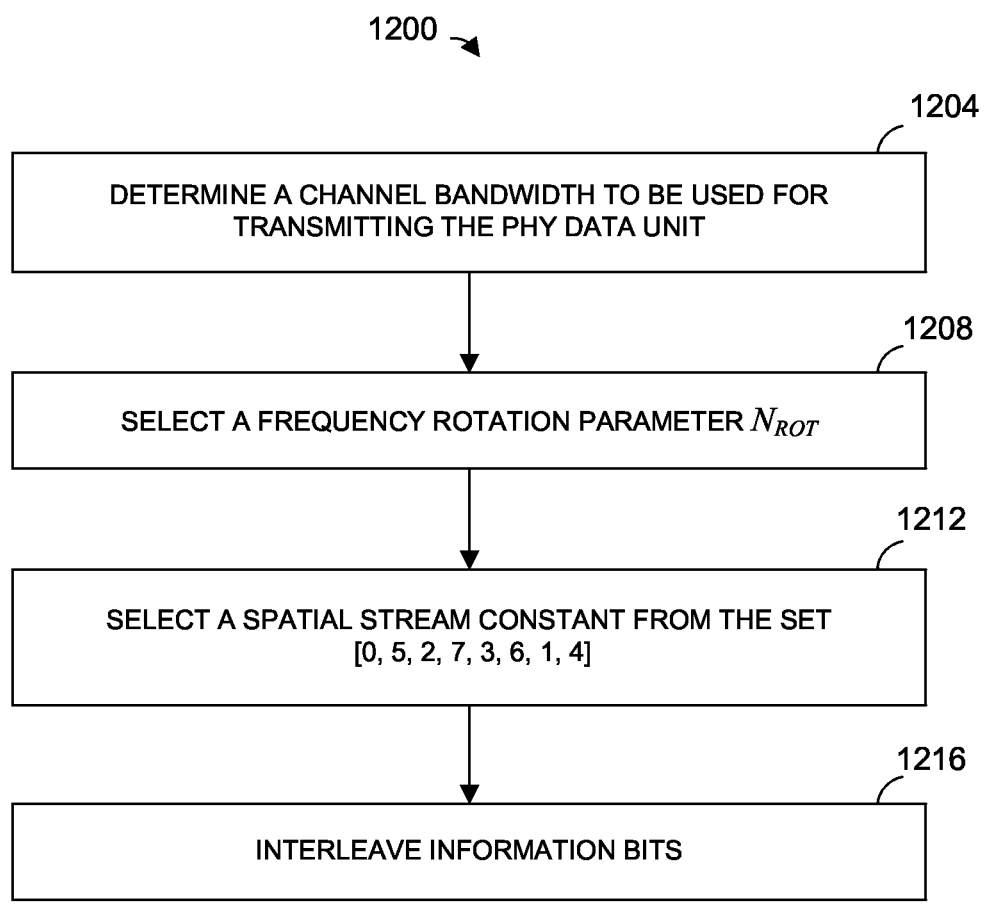
FIG. 12 is a flow diagram of an example method for interleaving information bits in a data unit, according to an embodiment.

FIG. 12 is a flow diagram of an example method 1200 for interleaving information bits in a data unit, according to an embodiment. The method 1200 is implemented by the network interface 16 (e.g., the PHY processing unit 20) (FIG. 1), in an embodiment. The method 1200 is implemented by the network interface 27 (e.g., the PHY processing unit 29) (FIG. 1), in another embodiment. In other embodiments, the method 1200 is implemented by other suitable network interfaces.

At block 1204, a channel bandwidth that the data unit being generated occupies is determined. For example, in an embodiment, the data unit occupies one of 20 MHz bandwidth, a 40 MHz bandwidth, an 80 MHz bandwidth, or a 160 MHz depending on the particular system configuration for which the data unit is being generated. In other embodiments, the data unit being generated occupies another suitable bandwidth.

At block 1208, a frequency rotation parameter is selected from a plurality of frequency rotation parameters. For example, in an embodiment, the frequency rotation parameter $N_{ROT}$ is selected as discussed above. In an embodiment, a different $N_{ROT}$ is selected depending on the bandwidth determined at block 1204. For example, in an embodiment, $N_{ROT}$ equals 6, 13, or 28 for a 20 MHz channel, a 40 MHz channel, or an 80 MHz channel, respectively.

At block 1212, a spatial stream constant for the particular spatial stream is selected form the set [0, 5, 2, 7, 3, 6, 1, 4] in the case of 8 spatial streams or a corresponding subset thereof for cases of less than 8 spatial streams. For example, in the case of 7 spatial streams, the particular spatial stream constant is selected from the set [0, 5, 2, 7, 3, 6, 1]. That is, in this embodiment, the spatial stream constant $n_{iss}$ is equal to zero (0) for the first spatial stream, five (5) for the second spatial stream, two (2) for the third spatial stream, seven (7) for the fourth spatial stream, etc.

At block 1216, the data unit information bits are interleaved using the frequency rotation parameter and the spatial stream constants for each spatial stream selected at block 1208 and 1212, respectively. In an embodiment, the information bits are interleaved at block 1216 according to Equation 3. In some embodiments, the data unit information bits are interleaved at block 1216 based on the selections at blocks 1208 and 1212 only in the cases of five or more spatial streams. In one such embodiment, the information bits for the cases of four or less spatial streams are interleaved at block 1216 according to Equation 4.

Figure 13:
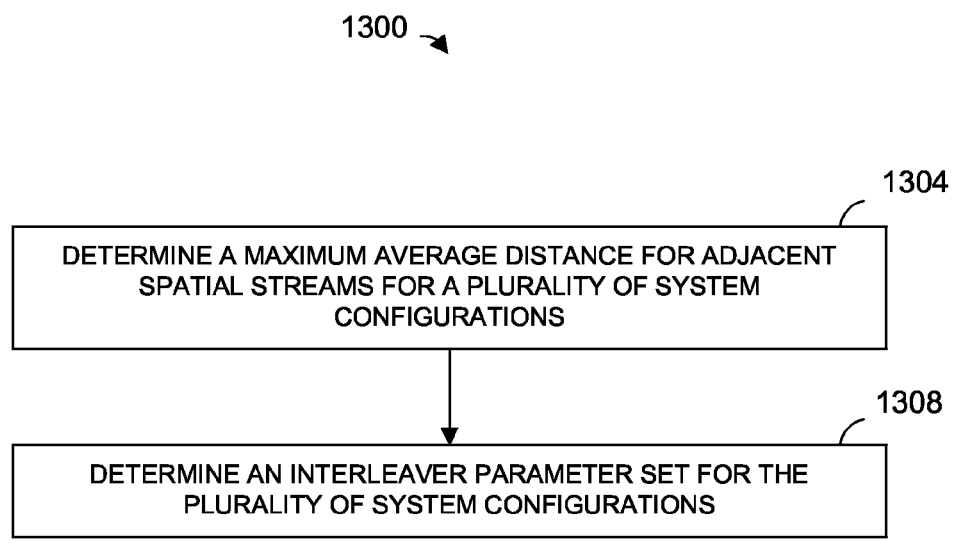
FIG. 13 is a flow diagram of an example method for determining interleaver parameters for a multiple input multiple output (MIMO) communication system, according to an embodiment.

FIG. 13 is a flow diagram of an example method 1300 for determining interleaver parameters for a multiple input multiple output (MIMO) communication system, according to an embodiment. In an embodiment, the method 1300 is used to determine interleaver parameters for a permutation performed by the interleavers 220 of FIG. 2 operating in the WLAN 10 of FIG. 1. In other embodiments, the method 1300 is used to determine interleaver parameters for other suitable interleaver operating in the WLAN 10 or for interleavers operating in another suitable network.

At block 1304, a maximum average distance in the adjacent spatial streams is determined for a plurality of system configurations (e.g., for various modulation and coding schemes (MCSs), various channel bandwidths, etc.). For example, in one embodiment, the maximum average distance is determined for two adjacent spatial streams using Equation 8. Alternatively, in another embodiment, the maximum average distance is determined among J (e.g., more than 2) spatial streams using Equation 9, where J is a positive integer with a value of at least 2.

At block 1308, an interleaver parameter set (e.g., the values for $N_{ROT}$ and for the spatial stream constant set, as discussed above) to be used in a plurality of system configurations is determined using the maximum average distance determined at block 1304 for each of the system configurations as a reference. In one embodiment, the interleaver parameter set is determined such that a low packet error rate (PER) is achieved in the plurality of system configurations. That is, in this embodiment, PER performance is used as the interleaver parameter design objective. In other embodiments, another suitable measure of channel performance is used as the interleave parameter design objective at block 1308.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed:

1. A method for interleaving information bits in a physical layer (PHY) data unit, the method comprising: determining a channel bandwidth to be used for transmitting the PHY data unit; selecting a frequency rotation parameter $N_{ROT}$ corresponding to the channel bandwidth; and when utilizing more than four spatial streams to transmit the PHY data unit, for each spatial stream, (i) selecting a spatial stream constant from a set [0, 5, 2, 7, 3, 6, 1, 4] or a subset thereof depending on a number of spatial streams to be utilized, wherein each constant in the set corresponds to a respective spatial stream, and wherein the subset of the set includes at least [0, 5, 2, 7, 3], and (ii) interleaving information bits according to the selected frequency rotation parameter $N_{ROT}$ and the selected spatial stream constant, including determining output spatial stream indices for the information bits according to $$r=\{j-J(i_{ss})N_{ROT}N_{BPSCS}\} \bmod N_{CBPSS}$$

$$j=0, 1, \ldots, N_{CBPSS}-1$$

wherein r and j represent output and input bit indices, respectively, $i_{ss}$ is a spatial stream index $N_{BPSCS}$ is a number of bits per subcarrier, $N_{CBPSS}$ is a number of coded bits for the spatial stream, and $J(i_{ss})$ is the spatial stream constant selected from the set [0, 5, 2, 7, 3, 6, 1, 4] or the subset thereof.

2. A method according to claim 1, wherein $N_{ROT}$=6 if the channel bandwidth is 20 MHz.

3. A method according to claim 1, wherein $N_{ROT}$=13 if the channel bandwidth is 40 MHz.

4. A method according to claim 1, wherein $N_{ROT}$=28 if the channel bandwidth is 80 MHz.

5. An apparatus, comprising: a network interface device configured to determine a channel bandwidth to be used for transmitting a physical layer (PHY) data unit, wherein the network interface device comprises an interleaver configured to, when more than four spatial streams are to be utilized, select a frequency rotation interleaving parameter $N_{ROT}$ corresponding to the channel bandwidth, and for each spatial stream, (i) select a spatial stream constant from a set [0, 5, 2, 7, 3, 6, 1, 4] or a subset thereof depending on a number of spatial streams to be utilized, wherein each constant in the subset corresponds to a corresponding spatial stream, and wherein the subset of the set includes at least [0, 5, 2, 7, 3], and (ii) interleave the information bits according to the selected frequency rotation parameter $N_{ROT}$ and the selected spatial stream constant, including determine output spatial stream indices for the information bits according to $$r=\{j-J(i_{ss})N_{ROT}N_{BPSCS}\} \bmod N_{CBPSS}$$

$$j=0, 1, \ldots, N_{CBPSS}-1$$

wherein r and j represent output and input bit indices, respectively, $i_{ss}$ is a spatial stream index, $N_{BPSCS}$ is a number of bits per subcarrier, $N_{CBPSS}$ is a number of coded bits for the spatial stream, and $J(i_{ss})$ is the spatial stream constant selected from the set [0, 5, 2, 7, 3, 6, 1, 4] or the subset thereof.

6. An apparatus according to claim 5, wherein $N_{ROT}$=6 if the channel bandwidth is 20 MHz.

7. An apparatus according to claim 5, wherein $N_{ROT}$=13 if the channel bandwidth is 40 MHz.

8. An apparatus according to claim 5, wherein $N_{ROT}$=28 if the channel bandwidth is 80 MHz.

* * * * *